United States Patent [19]

Endo et al.

[11] Patent Number: 4,745,668
[45] Date of Patent: May 24, 1988

[54] METHOD OF MANUFACTURING AN ELECTRIC DOUBLE LAYER CAPACITOR

[75] Inventors: Masanori Endo; Yoshinori Mori; Michinobu Maesaka, all of Nagaokakyo, Japan

[73] Assignee: Murata Manufacturing Co., Ltd., Japan

[21] Appl. No.: 919,048

[22] Filed: Oct. 15, 1986

[30] Foreign Application Priority Data

Oct. 18, 1985 [JP] Japan .............................. 60-234326

[51] Int. Cl.⁴ ........................................... H01G 13/00
[52] U.S. Cl. ................................................ 29/25.42
[58] Field of Search ............... 29/25.42; 156/247, 248, 156/249, 250

[56] References Cited

U.S. PATENT DOCUMENTS 3,683,469 8/1972 Capek et al. ..................... 29/25.42
4,594,758 6/1986 Watanabe et al. ................. 29/25.42
4,645,555 2/1987 Kuboyama ...................... 156/249 X

FOREIGN PATENT DOCUMENTS 56-4227 1/1981 Japan .
57-40916 3/1982 Japan .

Primary Examiner—Timothy V. Eley
Attorney, Agent, or Firm—Ostrolenk, Faber, Gerb & Soffen

[57] ABSTRACT

An electric double layer capacitor comprises a pair of insulating gaskets having through-holes which are superposed and on opposite sides of a separator, and polarizable electrodes received in the through-holes. The method comprises steps of applying adhesive to a surface region of an insulating gasket enclosing a through-hole thereof, adhering a separator sheet to the gasket by the adhesive, and cutting the separator sheet in a portion outside the inner peripheral edge of the region applied with the adhesive to enclose the through-hole, thereby to obtain a separator integrated with the gasket.

3 Claims, 3 Drawing Sheets

METHOD OF MANUFACTURING AN ELECTRIC DOUBLE LAYER CAPACITOR

BACKGROUND OF THE INVENTION

1. Field of the Invention

The present invention relates to a method of manufacturing an electric double layer capacitor with an improved step of superposing an insulating gasket with a separator.

2. Description of the Prior Art

Japanese Patent Laying-Open Gazettes Nos. 4227/1981 and 40916/1982 disclose examples of methods of manufacturing electric double layer capacitors. As shown in FIGS. 8 and 9, a conventional electric double layer capacitor 1 comprises an ion-permeable insulating separator 2 interposed between a pair of polarizable electrodes 4 and 6. Gaskets 8 and 10 of insulating rubber are provided around the peripheries of the polarizable electrodes 4 and 6. The polarizable electrodes 4 and 6 are formed by, e.g., activated carbon being hardened by a binder and being impregnated with an electrolyte. Numerals 12 and 14 indicate collecting electrodes, which are fixed to the outer surfaces of the gaskets 8 and 10.

In order to simultaneously obtain a number of such electric double layer capacitors 1, the prior art has generally employed a relatively large-sized gasket sheet made of the material for the gaskets 8 and 10. This gasket sheet is appropriately formed with through-holes serving as through-holes 8a and 8b of the gaskets 8 and 10, so that the separators 2 previously cut in circular configurations can be picked up one by one by forceps or the like and located on the gasket sheet to cover the said through-holes through a manual operation. In this case, adhesive is previously applied to either surface regions of the gasket sheet around the through-holes, or outer surfaces of the separators 2, so that the separators 2 are adhered to the regions around the through-holes of the gasket sheet upon location of the separators 2. Thereafter the polarizable electrodes 4 or 6 are inserted in the through-holes and the gasket sheet is cut in the units of respective electric double layer capacitors, each of which is assembled as shown in FIG. 8, to obtain the electric double layer capacitor 1 as shown in FIG. 9.

As hereinabove described, complicated manual operation has generally been required to adhere the separator 2 to the gasket 8 or 10. Further, the surface of the separator 2 may be damaged by the forceps or the like, leading to defects such as imperfect insulation.

SUMMARY OF THE INVENTION

Accordingly, it is an object of the present invention to provide a method of manufacturing an electric double layer capacitor comprising a novel separator mounting step, which requires no complicated manual operation and causes no damage to the separator.

Provided according to the present invention is a method of manufacturing an electric double layer capacitor which comprises a pair of insulating gaskets having through-holes which are superposed and separated by a separator and polarizable electrodes received in the through-holes of the gaskets. The method according to the present invention comprises steps of preparing an insulating gasket having a through-hole and applying adhesive to a surface region of the gasket enclosing the through-hole, adhering a separator sheet, to the surface region of the gasket applied with the adhesive, through use of the adhesive, cutting the separator sheet along a portion outside the inner peripheral edge of the region applied with the adhesive to enclose the through-hole thereby to form a separator adhered to the surface of the gasket, and peeling the separator sheet from the separator.

According to the present invention, the separator is obtained, the separator being adhered to the surface of the gasket, by cutting the separator sheet adhered to the gasket through the adhesive applied to the surface region of the gasket enclosing the through-hole. Thus, a number of electric double layer capacitors can be effectively mass-produced without requiring a complicated operation of picking up separators one by one for every electric double layer capacitor by means of forceps, to locate the separators on the through-holes of the gaskets to be adhered to the same. Further, no forceps are in contact with the separators adhered to the gaskets to cover the through-holes, whereby damage of the separators is decreased. Thus, defects such as imperfect insulation can be remarkably reduced.

These and other objects, features, aspects and advantages of the present invention will become more apparent from the following detailed description of embodiments of the present invention when taken in conjunction with the accompanying drawings.

BRIEF DESCRIPTION OF THE DRAWINGS

FIGS. 5 to 7 are diagrams illustrating a second embodiment of the present invention, in which FIG. 5 is a sectional view showing a step of cutting a separator sheet, FIG. 6 is a sectional view showing an adhered member obtained through the step of FIG. 5, and FIG. 7 is a sectional view of an electric double layer capacitor as obtained;

DESCRIPTION OF THE PREFERRED EMBODIMENTS

Figure 4:
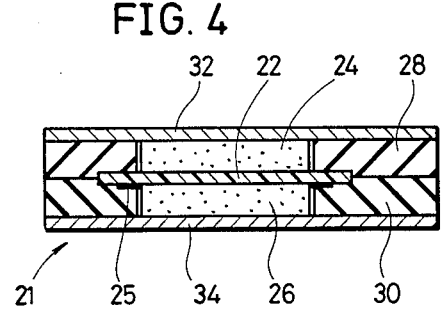
FIG. 4 is a sectional view showing an electric double layer capacitor obtained through use of the adhered member as shown in FIG. 3.

FIG. 4 is a sectional view showing an electric double layer capacitor 21 obtained through a manufacturing method according to an embodiment of the present invention. The electric double layer capacitor 21 comprises a separator 22 of, e.g., polyolefin and insulating gaskets 28 and 30 of, e.g., insulating rubber placed on both sides of the separator 22 to hold the same. In this embodiment, the separator 22 is adhered to one gasket 30 by adhesive 25 applied to the periphery of a through-hole in the gasket 30.

The gaskets 28 and 30 are provided with through-holes for receiving polarizable electrodes 24 and 26 of, e.g., activated carbon and a sulfuric acid electrolyte respectively. Collecting electrodes 32 and 34 formed from, e.g., conductive rubber sheets are adhered to outermost portions of the outer surfaces of the gaskets 28 and 30.

Figure 1:
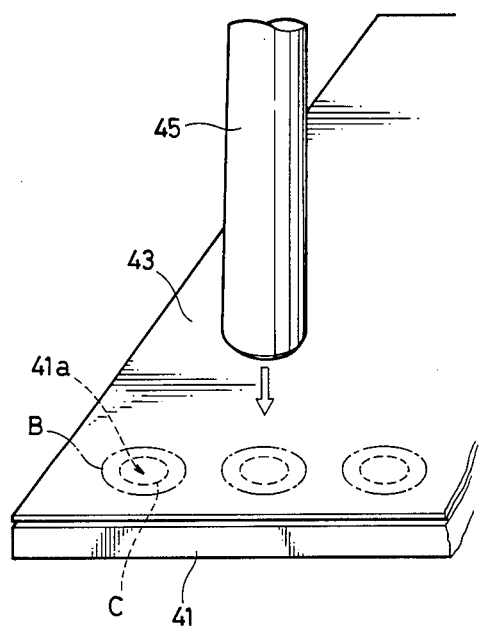
FIG. 1 is a perspective view showing a step of cutting a separator sheet in an embodiment of the present invention.
Figure 1A:
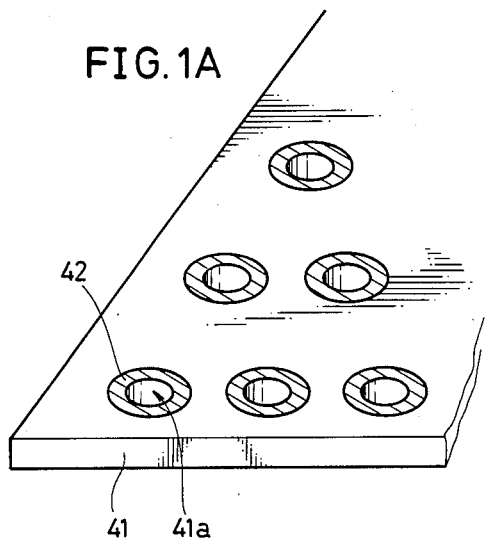
FIG. 1A is a perspective view showing a gasket sheet applied with adhesive.

A description will now be presented of the method of manufacturing the electric double layer capacitor 21 as shown in FIG. 4. As shown in FIG. 1A, a gasket sheet 41 provided with a plurality of through-holes 41a is prepared to simultaneously obtain a number of electric double layer capacitors. Then adhesive 42 is applied to the peripheries of the through-holes 41a of the gasket sheet 41, to enclose the through-holes 41a. The expression "to enclose the through-holes 41a" is directed not only to the circular annular configurations as shown in FIG. 1A, but to all configurations defining annuluses such as noncircular ring-like configurations around the through-holes 41a.

Figure 2:
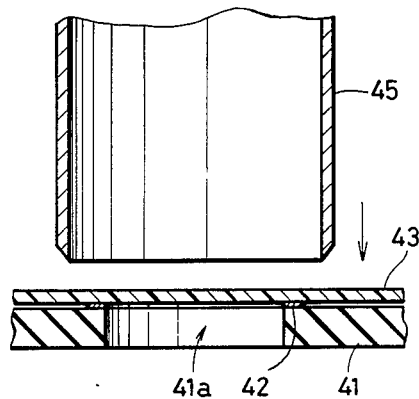
FIG. 2 is an enlarged sectional view of FIG. 1.

Then a separator sheet 43 of material for forming separators is superposed on the upper surface of the gasket sheet 41 as shown in FIG. 1A, i.e., on the surface applied with the adhesive 42. FIGS. 1 and 2 show the superposed state. The separator sheet 43 is partially adhered to the gasket sheet 41 by the adhesive 42. Referring to FIG. 1, one-dot chain lines B denote outer edges of regions applied with the adhesive 42 and broken lines C denote peripheral edges of the through-holes 41a.

Then, as shown in FIGS. 1 and 2, a cutting edge 45, which is to be concentrically positioned on each through-hole 41a, is downwardly moved from above to cut the separator sheet 43. As shown in FIG. 2, the cutting edge 45 in this embodiment is larger in diameter than the outer edge of the region applied with the adhesive 42. Thus, the separator sheet 43 is cut by the cutting edge 45 and then can be peeled from the separator 22 adhered to the gasket sheet 41 by the adhesive 42, thereby to obtain an adhered member as shown in FIG. 3.

Figure 3:
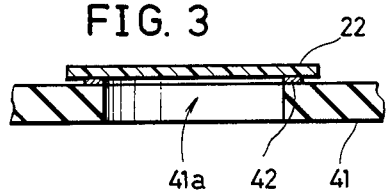
FIG. 3 is an enlarged sectional view showing an adhered member obtained through the steps shown in FIGS. 1 and 2.

As seen in FIG. 3, the adhesive 42 is not spread outwardly beyond the outer peripheral edge of the separator 22, since the cutting edge 45 in the aforementioned size is employed.

As hereinabove described, the plurality of separators 22 are located on the gasket sheet 41 and adhered to the same, to effectively obtain the adhered members as in FIG. 3 without damaging the separators 22. Thus, the polarizable electrode 24 or 26 is received in each through-hole 41a of the gasket sheet 41 while the other gasket 28 and the other polarizable electrode are superposed with the opposite side of the separator 22 to be held by the collecting electrodes 32 and 34, thereby to obtain the electric double layer capacitor 21 as shown in FIG. 4.

Figure 5:
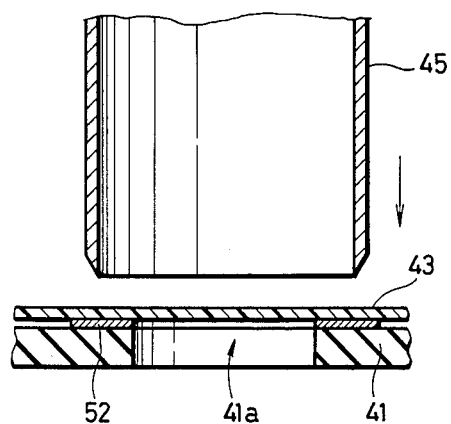
Figure 6:
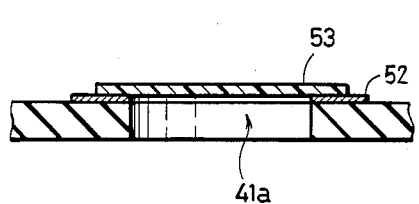
Figure 7:
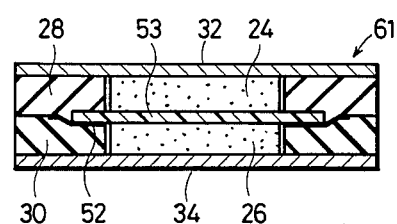
Figure 8:
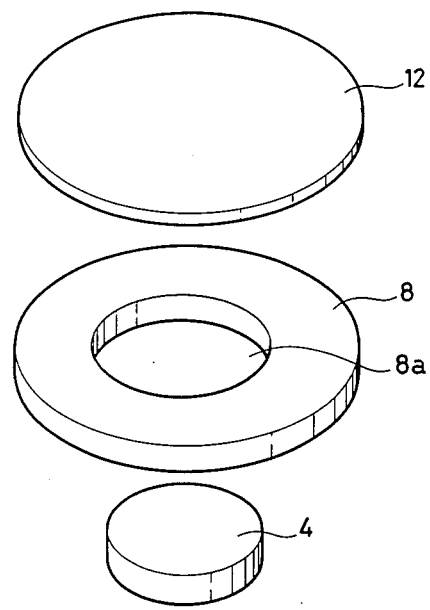
FIG. 8 is an exploded perspective view illustrating a conventional method of manufacturing an electric double layer capacitor.
Figure 9:
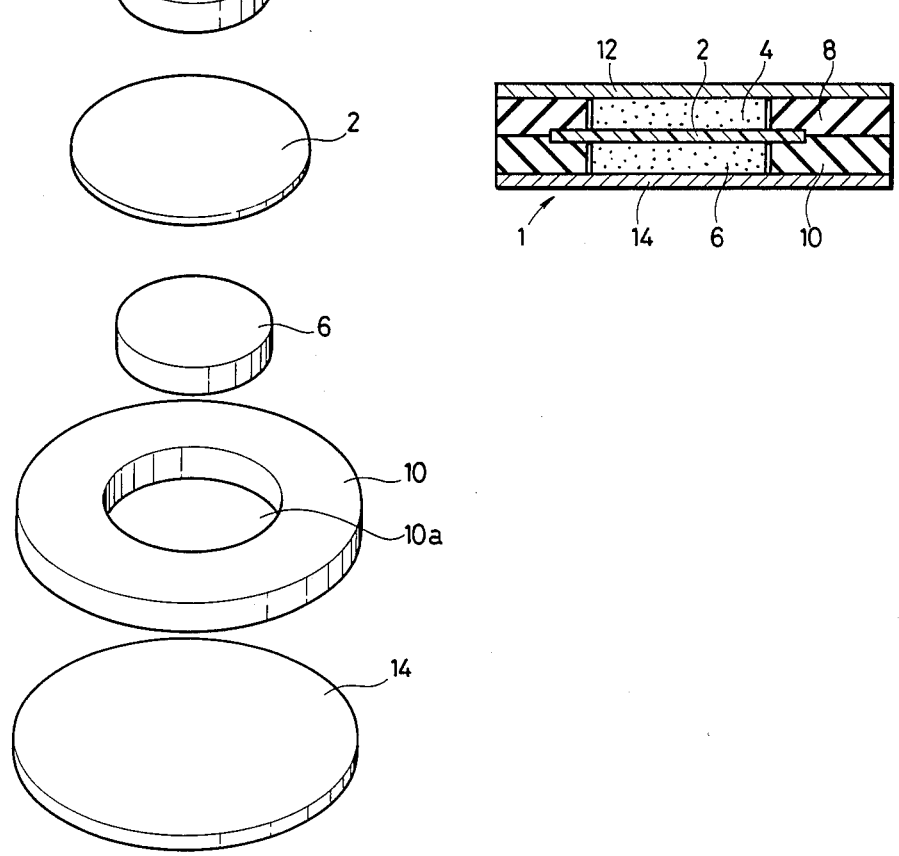
FIG. 9 is a sectional view showing the conventional electric double layer capacitor in an assembled state.

FIGS. 5 to 7 are diagrams illustrating a second embodiment of the present invention. In the second embodiment, adhesive 52 is applied to a wide portion of the periphery of each through-hole 41a of a gasket sheet 41. In other words, the adhesive 52 is applied to a region enclosing the through-hole 41a, and the outer peripheral edge of the region is larger in diameter than the cutting edge 45.

A separator sheet 43 adhered to the gasket sheet 41 is cut by the cutting edge 45 and peeled from the gasket sheet 41, thereby to obtain an adhered member as shown in FIG. 6. In the adhered member as shown in FIG. 6, the adhesive 52 is applied to a region wider in diameter than the cutting edge 45 to outwardly spread beyond a separator 53 obtained after peeling of the separator sheet 43. Therefore, the separator sheet may not be easily peeled from the separator 53 since the adhesive 52 is outwardly spread beyond the separator 53. However, the separator 53 can be adhered to the gasket sheet 41 more efficiently in comparison with the conventional case in which separators are picked up one by one by forceps to be located on respective through-holes.

The adhered member as shown in FIG. 6 can be subjected to a subsequent assembling step similarly to the embodiment shown in FIGS. 1 to 4, except that the adhesive 52 is outwardly spread beyond the separator 53. Thus, an electric double layer capacitor 61 as shown in FIG. 7 can be implemented by the second embodiment.

In each of the aforementioned embodiments, the cutting edge 45 may preferably be preheated to melt the portion of the separator sheet 43 for defining the separator in cutting of the separator sheet 43.

Although the through-holes 41a and the separators 22 and 53 have circular configurations in the embodiments shown in FIGS. 1 to 7, the configurations thereof (as seen from above) are not particularly restricted to circular configurations.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an electric double layer capacitor comprising a pair of insulating gaskets having through-holes, said gaskets being superposed and separated by a separator, and polarizable electrodes received in said through-holes of said gaskets, said method comprising the steps of:

preparing an insulating gasket having a through-hole;

applying adhesive to a surface region of said gasket enclosing said through-hole;

adhering a separator sheet, to said surface region of said gasket having said adhesive applied thereto, said adhering being through use of said adhesive;

cutting said separator sheet, along a portion outside the inner peripheral edge of said region applied with said adhesive and enclosing said through-hole, thereby to form a separator adhered to the surface of said gasket;

peeling said separator sheet from said gasket and thereby leaving said separator adhered to said gasket; and attaching a second insulating gasket having a through-hole, to said first-mentioned insulating gasket and to said separator, said two through-holes being located at corresponding positions on opposite sides of said separator.

2. A method of manufacturing an electric double layer capacitor in accordance with claim 1, wherein said cutting step is carried out by heating a cutting edge and bringing the same into contact with said separator sheet under pressure thereby to fuse the same.

3. A method of manufacturing an electric double layer capacitor in accordance with claim 1, wherein said cutting of said separator sheet is performed in a portion of said separator sheet outside the outer peripheral edge of said region applied with said adhesive, so that said adhesive is applied to a portion on the surface of said gasket completely covered by said separator as left.

* * * * *